Patented Dec. 10, 1929

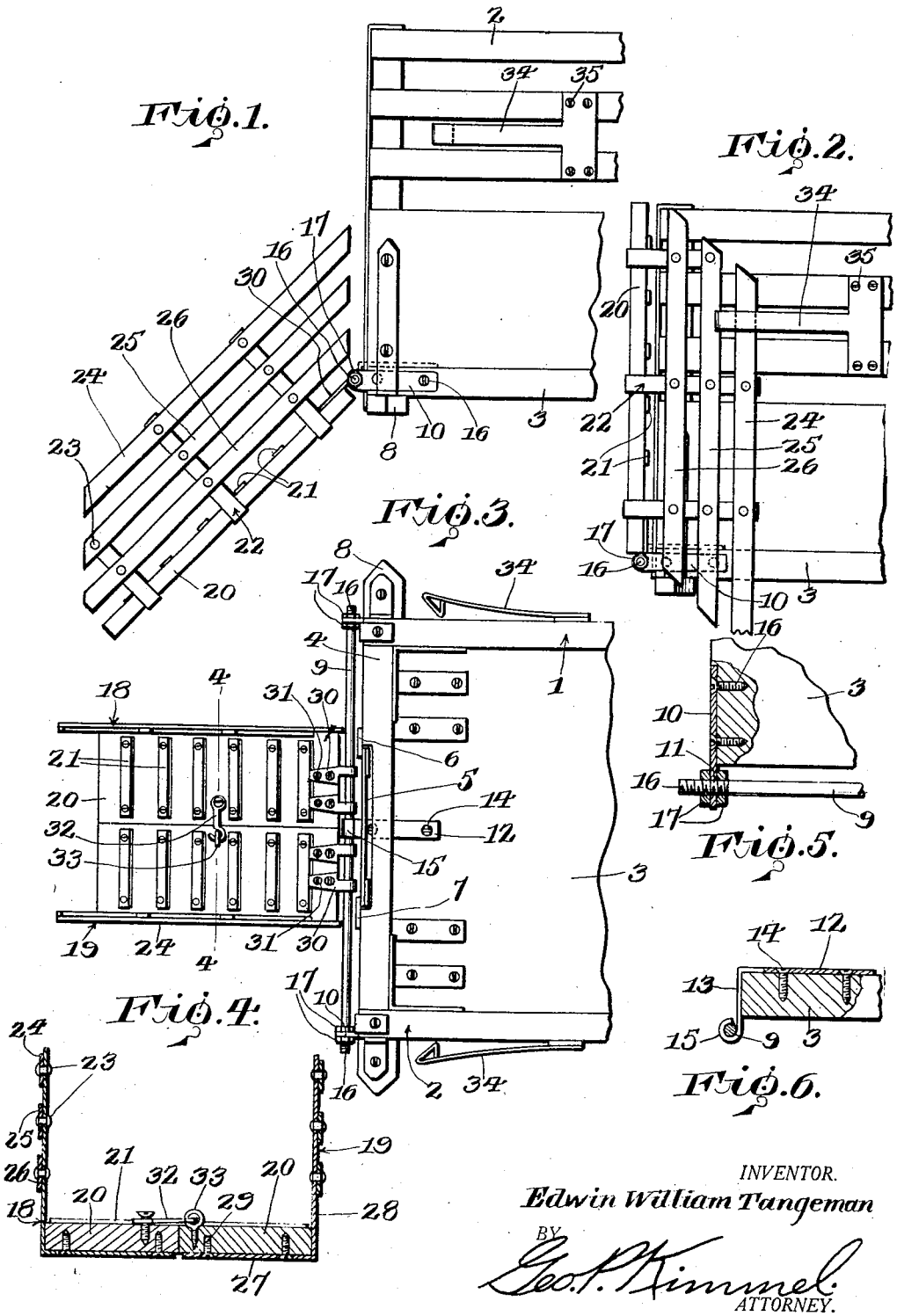

1,739,335

UNITED STATES PATENT OFFICE

EDWIN WILLIAM TANGEMAN, OF MADISON, SOUTH DAKOTA

LOADING CHUTE

Application filed January 12, 1928. Serial No. 246,217.

This invention relates to a loading chute, designed primarily for the loading of live stock into a vehicle, such as a truck, but it is to be understood that a loading chute, in accordance with this invention, may be employed for any purposes for which it is found applicable, and the invention has for its object to provide, in a manner as hereinafter set forth, a sectional, side rail chute capable of being expeditiously positioned for loading purposes with respect to a vehicle, such as a truck, when desired, and further having the sections thereof so constructed and arranged whereby, when the chute is not desired for use, such sections can be detachably secured in upstanding position to the body of the vehicle and to overlap the sides and back of the vehicle body.

A further object of the invention is to provide, in a manner as hereinafter set forth, a loading chute for the purpose referred to comprising a pair of sections each provided with side rails and with the sections so constructed and arranged to provide for expeditiously connecting them together and further to dispose the chute at an inclination with respect to the vehicle to be loaded.

Further objects of the invention are to provide, in a manner as hereinafter set forth, a loading chute which is simple in its construction and arrangement, strong, durable, compact, thoroughly efficient in its use, readily installed with respect to a vehicle, such as a truck body, expeditiously handled when setting the same in and removing it from loading position, and comparatively inexpensive to manufacture.

With the foregoing and other objects in view the invention consists of the novel construction, combination and arrangement of parts as hereinafter more specifically described in detail and illustrated in the accompanying drawing wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view of a truck body showing the adaptation therewith of a loading chute in accordance with this invention and with the chute positioned for loading purposes.

Figure 2 is a fragmentary view of a truck body showing the adaptation therewith of a loading chute in accordance with this invention and with the chute arranged in non-loading position.

Figure 3 is a fragmentary view in top plan of a truck body showing the adaptation therewith of a loading chute in accordance with this invention and with the chute in loading position.

Figure 4 is a section on line 4—4 Figure 3.

Figures 5 and 6 are sectional details.

Referring to the drawings in detail 1 and 2 denote the sides of a truck body, 3 the bottom and 4 the end thereof. The end 4 is provided with a vertical movable gate 5 for the entrance of the live stock to the truck body. The end 4 has secured thereto spaced keepers 6, 7 for the gate 5. The bottom 3 of the truck body is formed with an end brace 8 which projects laterally from each of the sides 1, 2. As illustrated the truck body is of slotted form and constructed of longitudinally and vertically disposed slats. It is to be understood that the truck body is illustrated by way of example for the purpose of showing the adaptation with a vehicle of a loading truck in accordance with this invention.

Opposing and spaced from the rear end of the bottom 3 is a stationary pivot rod 9 of greater length than the width of said bottom 3. Countersunk in each side edge of the bottom 3 and projecting rearwardly therefrom are supporting straps 10 and each of which is formed with an opening 11 in that part thereof which projects rearwardly from the bottom 3. Secured to the bottom 3, at the rear thereof is an angle shaped support or hanger comprising a longitudinally disposed arm 12 and a vertically extending arm 13. The arm 12 is secured to the bottom 3 by the holdfast devices 14. The arm 13 is positioned against the rear edge of the bottom 3 and depends a substantial distance therebelow and is formed with an inturned portion to provide a loop 15. The straps 10 are secured to the bottom 3 by the holdfast devices 16. The rod 9 extends through the openings 11 and also through the loop 15 and the latter is positioned substantially at the longitudinal center of the bottom 3. The rod 9 is threaded at each end as at 16 and carries at each end a pair of securing nuts 17 for fixedly securing the rod 9 in position.

The chute is formed of two independent sections 18, 19 respectively and as each section is of like construction, but one will be described, as the description of one will apply to the other. The sections 18, 19 are oppositely disposed and the combined width of such sections is less than the width of the end or tail gate 4 of the truck body. The sections 18, 19 of the chute are independent of the end 4 or tail gate of the truck body. Each of said sections includes a bottom 20 having its upper face provided with spaced transversely extending slats 21 to provide a foot hold for the stock. Secured to the outer edge of the bottom 20 is a series of spaced standards 22 having connected to the outer faces thereof by the holdfast devices 23 a series of spaced side rails 24, 25 and 26. The inner ends of said side rails are beveled and the rail 24 is of greater length than the rail 25 and the rail 25 is of greater length than the rail 26. The outer ends of the rails 24, 25 and 26 are arranged respectively one in advance of the other. The standards 22 are formed from an angle shaped metallic strip bent to provide a horizontally disposed arm 27 and a vertically disposed arm 28. The arms 28 provide the standards 22. The arms 27 are positioned against the lower face of the bottom 21 and are fixedly secured therewith by the holdfast devices 29. Connected to the bottom 20 at the inner end thereof is a pair of hangers 30 which are pivotally and slidably mounted on the rod 9. The hangers 30 are arranged in spaced relation, project a substantial distance from the inner end of the bottom 20 and are fixedly secured to the latter by the holdfast devices 31. The bottom of the section 18 carries a pivoted latch 32 adapted to engage in an eye 33 carried by the bottom 20 of section 19 for detachably connecting the bottoms of said sections in abutting relation to arrange the chute in loading or unloading position, as shown in Figure 3.

When the sections of the chute are disconnected from each other they can be slid on the rod 9 and shifted to an upstanding position so that the bottom of a section will oppose the back 4 and a side of the section will oppose a side 1 or 2 and when the chute section is arranged in the position just stated, it is detachably connected to a side of the truck body by a resilient latch 34. The latches are fixedly secured, by the holdfast devices 35 to the outer faces of the sides 1, 2 of the truck body and engage with the rail 24 to maintain the sections of the chute in the position as shown in Figure 2.

It is thought the many advantages of a loading chute, in accordance with this invention, can be readily understood, and although the preferred embodiment of the invention is as illustrated and described, yet it is to be understood that changes in the details of construction can be had which fall within the scope of the invention as claimed.

What I claim is:

1. A chute adapted to be carried by the body of a vehicle and independent of the tail gate of the latter, said chute being of less width than the width of such tail gate and comprising a pair of oppositely disposed, independent sections each including a bottom and side rails, a pivot rod for connection with the rear of the vehicle body transversely thereof, means carried by each of said sections for pivotally and slidably connecting it to said rod, and means for detachably connecting said sections together to arrange the chute in loading and unloading positions leading to and from such tail gate.

2. A chute adapted to be carried by the body of a vehicle and independent of the tail gate of the latter, said chute being of less width than the width of such tail gate and comprising a pair of oppositely disposed, independent sections each including a bottom and side rails, a pivot rod for connection with the rear of the vehicle body transversely thereof, means carried by each of said sections for pivotally and slidably connecting it to said rod, means for detachably connecting said sections together to arrange the chute in loading and unloading positions leading to and from such tail gate, and means for independently connecting each of said sections against one side of the tail gate of the vehicle body when the sections are disconnected from each other to maintain said sections in an upright position relative to said body.

3. A chute adapted to be carried by the body of a vehicle and independent of the tail gate of the latter, said chute being of less width than the width of such tail gate and comprising a pair of oppositely disposed, and independent sections each including a bottom, side rails and spaced slats secured to the upper face of the bottom, a pivot rod, means for suspending said rod rearwardly of and transversely of the vehicle body, means carried by each of said sections for pivotally and slidably connecting it to said rod, and means for detachably connecting the bottoms of said sections in abutting relation to arrange the chute in loading and unloading positions leading to and from such tail gate.

4. A chute adapted to be carried by the body of a vehicle and independent of the tail gate of the latter, said chute being of less width than the width of such tail gate and comprising a pair of oppositely disposed independent sections each including a bottom, side rails and spaced slats secured to the upper face of the bottom, a pivot rod, means for suspending said rod rearwardly of and transversely of the vehicle body, means carried by each of said sections for pivotally and slidably connecting it to said rod, means for detachably connecting the bottoms of said sections in abutting relation to arrange the chute in loading and unloading positions leading to and from such tail gate, and means for independently connecting each of said sections against one side of the tail gate of the vehicle body when the sections are disconnected from each other to maintain said sections in an upright position with respect to the vehicle body and tail gate.

5. A chute adapted to be carried by the body of a vehicle and independent of the tail gate of the latter, said chute being of less width than such tail gate and comprising a pair of oppositely disposed, independent sections each including a bottom, side rails and spaced slats secured to the upper face of the bottom, a pivot rod for suspension from the rear of the vehicle body transversely thereof, and means carried by the bottom of each of said sections for pivotally and slidably connecting the sections to said rod, whereby said sections can be shifted towards each other to have said bottoms abut to arrange the chute in loading and unloading positions leading to and from such tail gate.

6. A chute adapted to be carried by the body of a vehicle and independent of the tail gate of the latter, said chute being of less width than such tail gate and comprising a pair of oppositely disposed, independent sections each including a bottom, side rails and spaced slats secured to the upper face of the bottom, a pivot rod for suspension from the rear of the vehicle body transversely thereof, means carried by the bottom of each of said sections for pivotally and slidably connecting the sections to said rod, whereby said sections can be shifted towards each other to have said bottoms abut to arrange the chute in loading and unloading positions leading to and from such tail gate, and means carried by the bottoms of said sections for detachably connecting them together in abutting relation when the chute is arranged in loading and unloading positions with respect to the tail gate of the vehicle body.

7. A chute adapted to be carried by the body of a vehicle and independent of the tail gate of the latter, said chute being of less width than such tail gate and comprising a pair of oppositely disposed, independent sections each including a bottom, side rails and spaced slats secured to the upper face of the bottom, a pivot rod for suspension from the rear of the vehicle body transversely thereof, means carried by the bottom of each of said sections for pivotally and slidably connecting the sections to said rod, whereby said sections can be shifted towards each other to have said bottoms abut to arrange the chute in loading and unloading positions leading to and from such tail gate, means carried by the bottoms of said sections for detachably connecting them together in abutting relation when the chute is arranged in loading and unloading positions with respect to the tail gate of the vehicle body, and means for independently connecting each of said sections against one side of the tail gate of the vehicle body when the bottoms of the sections are disconnected from each other whereby the sections are maintained in an upright position with respect to the body and tail gate.

8. A chute carried by and for that type of a live stock transporting vehicle having intermediate the rear end thereof a closable opening for the passage of live stock, the combination of a pivot rod, means for securing said rod transversely and rearwardly of the bottom of the vehicle body, a pair of oppositely disposed, independent chute sections each including a bottom and side rails and each capable of being positioned vertically and at a downward inclination with respect to said rod, said sections being independent of the rear end of the vehicle, means for pivotally and slidably connecting said sections to said rod, means for detachably connecting each of said sections to the vehicle body in vertical position to oppose one side and said end of the vehicle body, and means for connecting said sections together when disposed at an inclination to provide a chute leading to said opening and with the chute of less width than the width of said rear end.

In testimony whereof, I affix my signature hereto.

EDWIN WILLIAM TANGEMAN.